United States Patent [19]
Converse et al.

[11] 3,794,166
[45] Feb. 26, 1974

[54] VERTICAL ROTATING SCREEN SEPARATOR

[75] Inventors: John O. Converse, Minneapolis; Kenneth W. Korpi, Ely, both of Minn.; John R. Diver, Lake Forest, Ill.

[73] Assignee: Hart-Carter Company, Minneapolis, Minn.

[22] Filed: Feb. 22, 1972

[21] Appl. No.: 228,036

[52] U.S. Cl................ 209/301, 209/332, 209/254, 209/367, 210/376
[51] Int. Cl............................................. B07b 1/26
[58] Field of Search... 209/302, 270, 301, 332, 309, 209/237, 254; 210/376, 366, 346; 207/70, 74 TE, 367, 366.5

[56] References Cited
UNITED STATES PATENTS

| | | | |
|---|---|---|---|
| 2,230,647 | 2/1941 | Knight | 209/302 X |
| 2,464,581 | 3/1949 | Jonsson | 209/270 |
| 2,514,159 | 7/1950 | Jonsson | 209/301 X |
| 2,870,913 | 1/1959 | Heckmann | 210/376 X |
| 3,032,200 | 5/1962 | Miller | 209/332 X |
| 3,422,955 | 1/1969 | Mock | 209/332 X |
| 2,358,453 | 9/1944 | Gilson | 209/237 X |
| 3,069,016 | 12/1962 | Kiesskalt | 209/309 X |
| 1,173,671 | 2/1916 | McKinlay | 209/309 X |
| 1,722,792 | 7/1929 | Gruender | 209/309 |

FOREIGN PATENTS OR APPLICATIONS

| | | | |
|---|---|---|---|
| 606,323 | 9/1956 | Canada | 210/376 |
| 235,479 | 6/1969 | U.S.S.R. | 209/302 |

*Primary Examiner*—Robert Halper
*Attorney, Agent, or Firm*—Rummler & Snow

[57] ABSTRACT

A rotating vertical cylindrical screen which is suspended by a spring from an inner frame member for the separation of seeds or other dry or moist-surface solid particulate matter according to size or shape or as to content of foreign matter. The aggregate containing the foreign matter is fed to the top of the screen through a rotating distributor means which casts the aggregate against the inner surface of the wall of the screen. The screen has a vertical mode of vibration imposed thereon by rotating eccentric weights operationally mounted thereto, which weights work in conjunction with the force of gravity to move said aggregate down the inner wall of the screen surface. The small particulates and foreign matter in the aggregate are readily transmitted through the wire mesh of the screen under the increased centrifugal force thereon due to their rotation with the rotating screen on which they lie. These small transmitted particulates are thrown outwardly from the rotating screen, and are caught by and collected in a surrounding shell to be subsequently discharged through a collecting funnel and spout. Those particulates larger than the screen mesh which do not pass therethrough remain within the screen and move further down the inside thereof to be subsequently discharged through a second collecting funnel and spout. The inner frame of the separator is supported by an outer spring suspension means on an outer frame structure which is set on the floor for effectively isolating all vertical shaking forces from the rotating eccentric weight drive from said floor or supporting structure. The rotating screen is effectively supported in a horizontal direction by a soft spring stabilizing means for isolating all lateral forces from said floor or supporting structure introduced therein by a rotating unbalance of aggregate flow through the screen.

24 Claims, 8 Drawing Figures

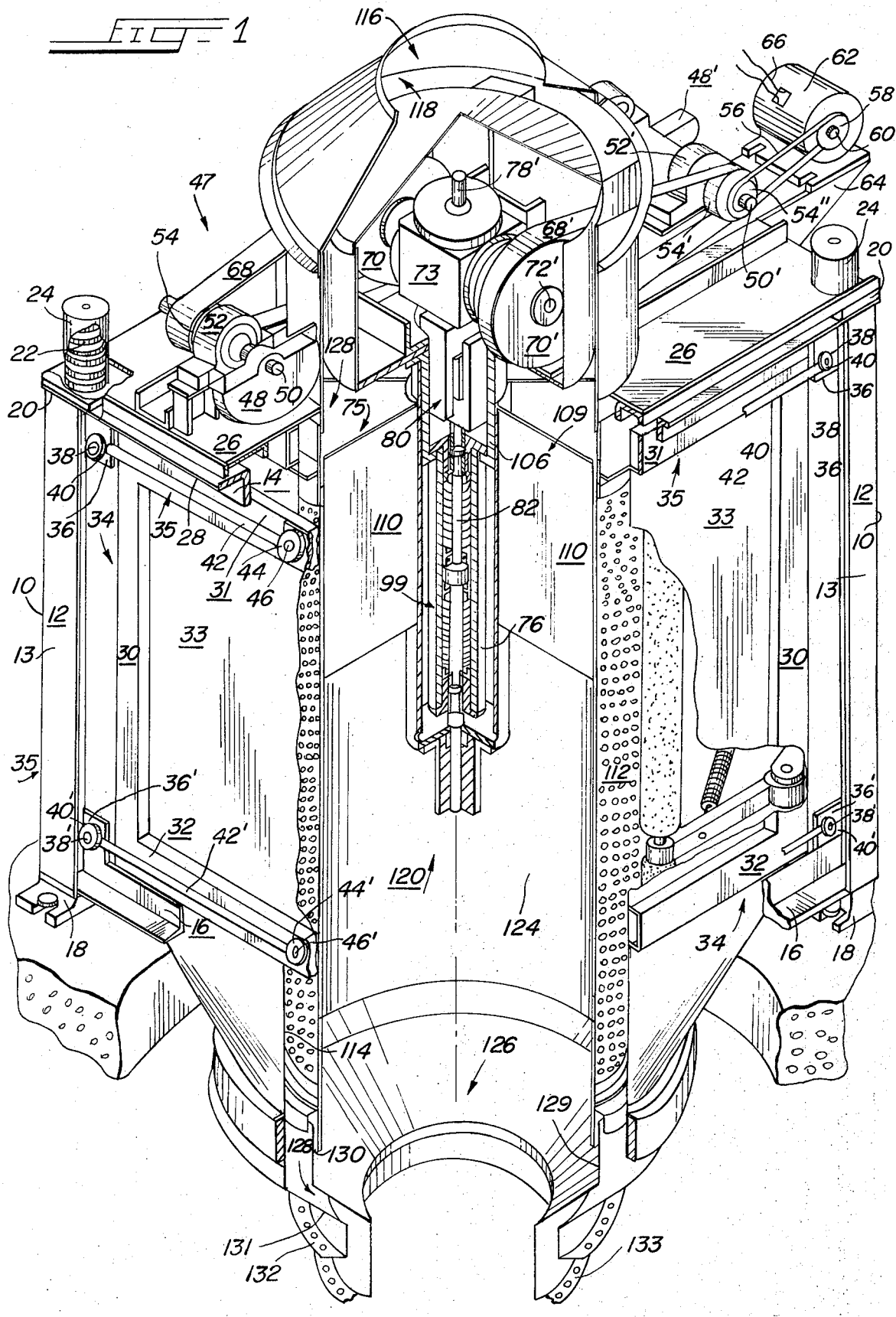

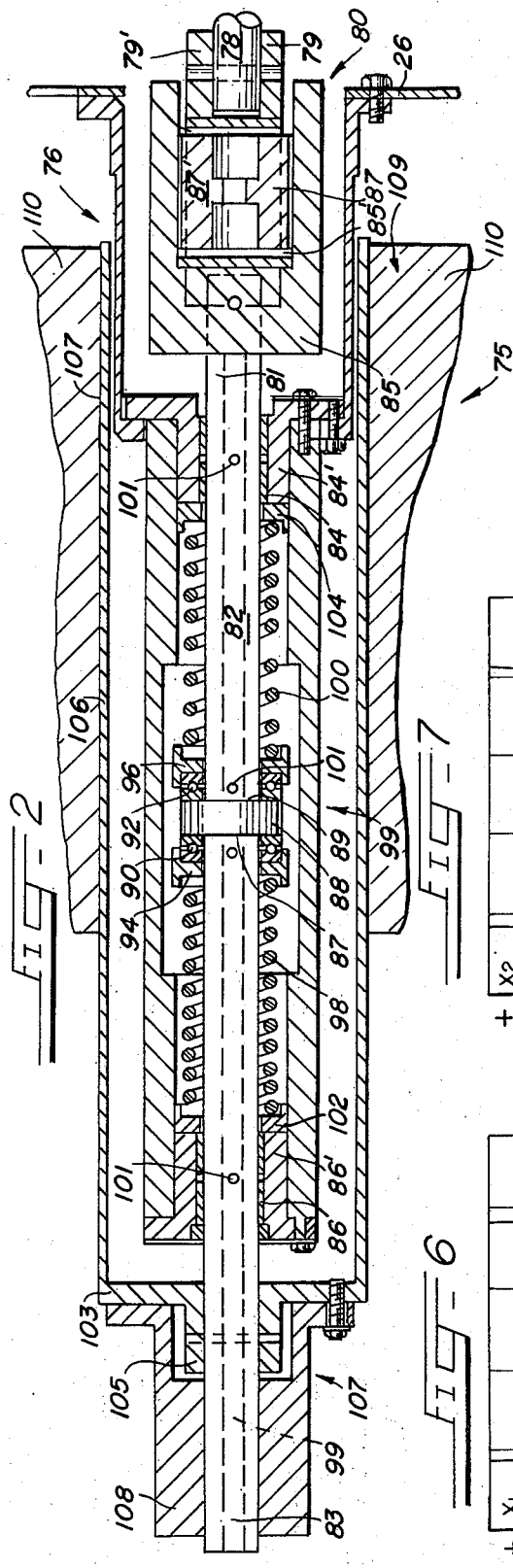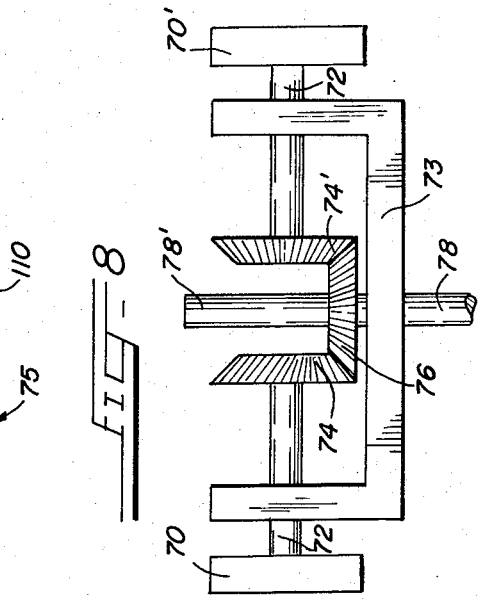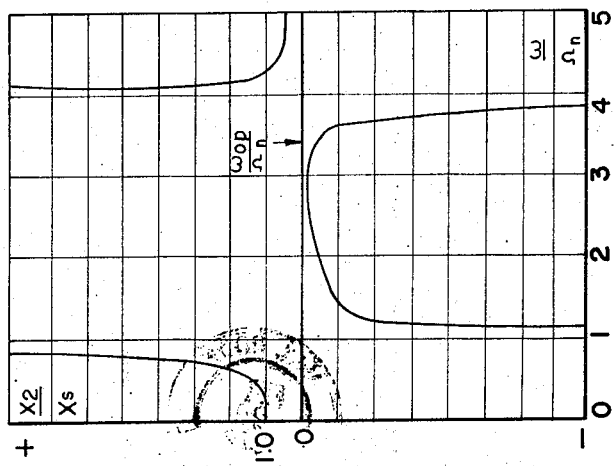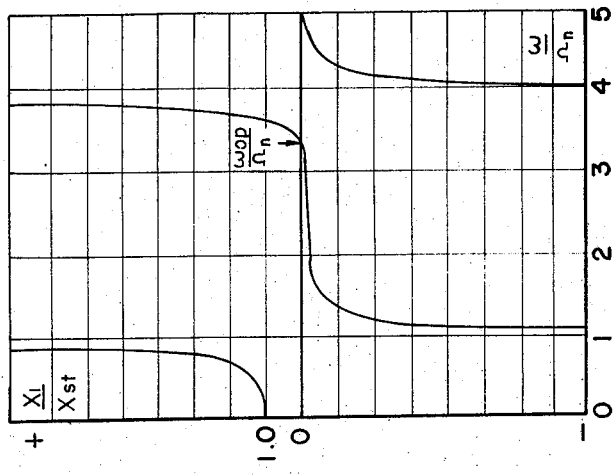

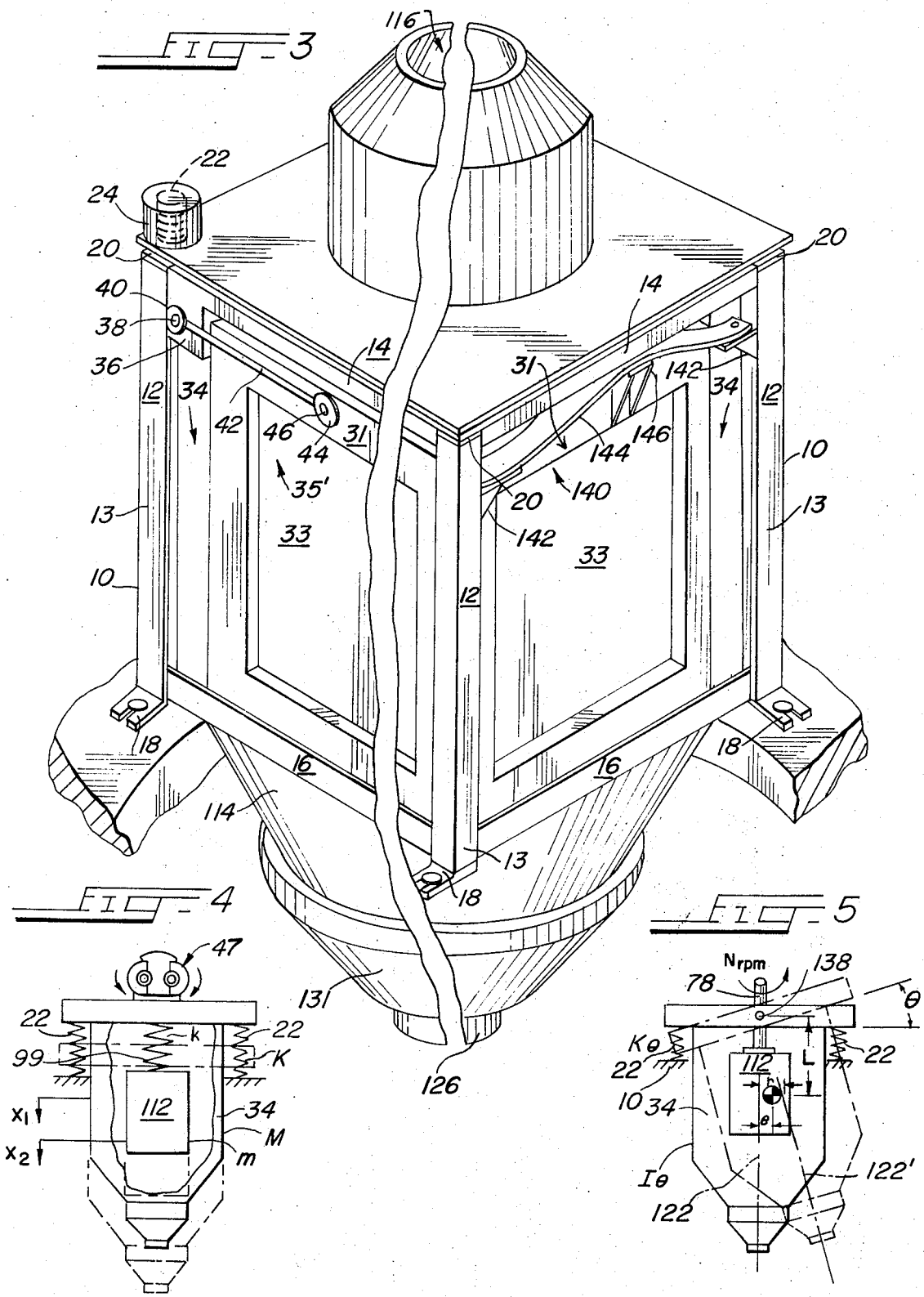

VERTICAL ROTATING SCREEN SEPARATOR

BACKGROUND OF THE INVENTION

Oscillating flat screens have been used for many years to make size separations in harvesting and processing seeds. In combines, they scalp off material larger than the crop seed and in processing plants they make further separation according to size and shape. The basic disadvantages of flat screen separators include a low capacity per unit area of the screen principally because of the limitation of the force of gravity acting on the particulate matter on the flat screen; a complex feeding requirement from the feed hopper into the flat separator because of the need for an even distribution of material on flat screens; a lack of a uniformly thick particulate layer across the entire width of the flat screen resulting in a lower separating efficiency; an ineffective screen cleaning because of the use of complicated slow-acting reciprocating brushes; a sensitivity to tilting because of the tendency of the dry particulate to pile up on the downhill side of the flat screen; and a requirement in general for excessive floor space for in-plant installation.

There is thus an established need for a screen separator machine having the basic advantages combining a higher capacity per unit area of screen; a simple feed; a uniform particulate layer on the screen; an effective screen cleaning; an insensitivity of performance of the machine to slope; a requirement of the machine for less floor space combined with a simple reliable drive mechanism; and a requirement of machine balance in which all vertical and horizontal shaking forces transmitted to the supporting floor or surrounding structure from the operation of the machine are substantially neutralized.

SUMMARY OF THE INVENTION

The main gist of this invention lies in the application of a rotating eccentric weight forcing function alternating force input to the primary mass of a two-degree of freedom spring and mass vibratory system and using the vibratory response of the secondary mass of this system for the purpose of shaking a vertical rotating screen separator.

A secondary gist of this invention lies in the tuning of the primary mass and spring system relative to the secondary mass and spring system so as to reduce the transmissibility of the shaking forces generated within the system to the floor or other supporting structure substantially to zero.

Another gist of this invention lies in the provision for horizontally compliant support for the secondary mass or the vertical rotating screen assembly of this two-degree of freedom system so tuned that the operating rotational speed of the screen is much greater than the critical speed of the assembly so as to reduce the shaking forces transmitted to the floor or other supporting structure for any rotating unblanace of aggregate flow therethrough.

This invention comprises the use of a vertical cylindrical screen which is rotatably suspended by an inner spring means having a vertical compliance on a spindle extension of an inner frame member to separate small particulate from a large aggregate on a continuous flow basis. The inner frame constitutes a large part of the primary mass and the cylindrical screen constitutes the main part of the secondary mass of the above two-degree of freedom system. The inner frame member is spring supported on an outer frame which is mounted to the floor or supported by surrounding structure. The screen rotates about its cylindrical axis in this machine and has a vertical vibratory motion superimposed thereon by a machine-shaking dynamic drive. This vibration in conjunction with the force of gravity transmits the aggregate containing the small particulate down and along the inner surface of said screen. The small particulate foreign matter is transmitted therealong under the influence of a high radial "G" centrifugal field generated by the rotation of the screen and effectively passed through said screen and collected in a surrounding shell having a funnel and spout. As the screen vibrates, the particulates bounce and their rate of travel acorss the screen is faster, thereby maintaining a thin layer of aggregate from which the particulate is more easily separated. The larger aggregate remaining within the screen is transmitted further along the inner surface thereof and does not pass therethrough to be discharged through a second collecting funnel and spout. The outer soft spring suspension with supports the inner frame member on the outer frame member permits the vertical vibratory response by the inner frame and cylindrical screen assembly under the dynamic drive input. The outer spring suspension is comprised of a plurality of spaced coiled springs symmetrically disposed about the axis of rotation of the cylindrical screen in a horizontal plane of action so that a relative vertical compression displacement of any two or more of the spaced springs results in an angular deflection relative to the horizontal of the inner frame and its spring-supported rotating cylindrical screen assembly. Stabilizing links which are located adjacent and parallel to the horizontal plane of action of this spring suspension system are pivotally mounted to both the fixed outer frame and the movable inner frame assuring elastic rectilinear vertical motion of the intersection of the cylindrical screen center line with this horizontal plane of action but allowing elastic angular deflection of the center line relative to the vertical. The transmissibility of the vertical shaking forces introduced into the machine by the dynamic drive and the gyrating horizontal forces by the rotating unbalance from the flow of aggregate within the screen to the supporting floor or surrounding structure is in this way substantially reduced. Resilient screen cleaning rollers which are driven by contact with the rotating outer surface of the cylindrical screen maximize the utility of this inventive concept.

DESCRIPTION OF THE DRAWINGS

In order to demonstrate the invention, reference is made to the non-limiting embodiment illustrated by the drawings in which:

FIG. 1 is a fragmentary cutaway perspective view of a vertical rotating screen separator according to the teachings of this invention;

FIG. 2 is a cross section of the screen hub rotary and shaking drive assembly according to the teachings of this invention;

FIG. 3 is a composite perspective view of a separator with lower stabilizing links removed and with an equivalent leaf spring support of the inner frame in place of the coil spring support;

FIG. 4 is a schematic of dynamic drive of this invention showing the vertical vibratory modes of motion of the inner frame and the basket screen in response to the vertical shaking forces;

FIG. 5 is a schematic showing the gyrating vibratory mode of motion of the inner frame and the basket screen in response to the lateral unbalance forces;

FIG. 6 shows the calculated vertical amplitude of response of the inner frame of the machine to various shaking drive frequency inputs;

FIG. 7 shows the calculated vertical amplitude of response of th basket screen to various shaking drive frequency inputs; and FIG. 8 is a perspective of the bevel gear box drive for the eccentric weights and the rotary screen.

THE PREFERRED EMBODIMENT

Referring to the drawings, particularly FIG. 1, a vertical rotating screen separator, which isolates vertical shaking forces from the floor or supporting structure, comprises an outer frame 10 having four vertical leg members 12, four top cross members 14 connecting the tops of the legs 12 and four lower cross members 16 connecting the bottoms thereof constituting a box-like assembly having four outer sides 13. Slotted feet 18 are attached to the four bottom ends of the four leg members 12 for bolting the frame 10 to the floor or other supporting structure. Pads 20 are mounted in horizontal relationship on the tops of the four legs 12. Four outer coil springs 22 are mounted in vertical relation in bearing on the top of the pads 20. Four spring retaining cups 24 each having its internal bottom bearing on the top of and enclosing in co-axial relationship each of the springs 22 in vertical relationship thereon. A top plate 26 having relief apertures therein for the extension of the springs 22 therethrough is fixedly mounted to the lip of each of four cups 24 surrounding the relief aperture and elastically suspended with a working clearance 28 above the top members 14 of outer frame 10 by the four springs 22 acting in compression thereon. An inner frame 34 has four vertical leg members 30, four top cross members 31 connecting the tops of the legs 30 and four lower cross members 32 connecting the bottoms of the struts 30 constituting a box-like assembly having four inner sides 33, all members being contained within the outer frame 10. The top plate 26 is fixedly mounted to the top cross members 31 of the inner frame 34 the weight of which compresses the springs 22.

Four parallel-bar, stabilizing four-bar linkages 35 pivotally connecting the four sides 33 of the inner frame 34 to the four sides 13 of the outer frame 10 comprise a plurality of upper and lower ears 36 and 36' mounted on the leg members 12 of outer frame 10 adjacent to the four pads 20 and the four feet 18, respectively, as shown in FIG. 1. One such parallel-bar linkage comprises pivot pins 38 and 38' which are horizontally mounted to the ears 36 and 36', respectively, having axes in mutually orthogonal vertical planes at the four pads 20 and the four feet 18 of the frame 10. Bored bosses 40 and 40' swively mount on the axes of the pins 38 and 38'. Links 42 and 42' connect at one end to the bosses 40 and 40'. Bored bosses 44 and 44' having axes parallel to the axes of bosses 40 and 40', respectively, mount to the other ends of the upper and lower links 42 and 42' having axes parallel to the axes of bosses 40 and 40', respectively. Pivot pins 46 and 46' engage bosses 44 and 44' at the other ends 42 and 42', respectively, and fixedly mount midway on the top and bottom cross-members 31 and 32 of the inner frame 34 assuring and fully stabilizing a rectilinear vertical mode of motion of the inner frame 34 within the outer frame 10.

In a rotary eccentric weight drive 47, first and second eccentric weights 48 and 48' each contra-rotate in the same plane on parallel shafts 50 and 50'. The weight 48 contra-rotates in phase with respect to the weight 48' so that there is a net horizontal alternating force of zero leaving a vertical alternating force input to the inner frame 34 reversing in direction at eccentric weight rotating frequency. Shafts 50 and 50' are rotatably mounted in pillow blocks 52 and 52' which in turn are mounted on the plate 26. Sheaves 54 and 54' are mounted on and driven by the shafts 50 and 50', respectively. A sheave 54'' is mounted on and drives an extension of the shaft 50' under engagement with a belt 56. A sheave 58 engages and drives the belt 56 and in turn is driven by a motor shaft 60 which is turned by a prime mover electric motor 62. Motor 62 is mounted on a bracket 64 and electrically connected to a power line 66. The bracket 64 is mounted to the outer frame 10.

A belt 68' engages and is driven by the sheave 54' and in turn drives a sheave 70' in a 5:2 step-down speed ratio. A horizontal shaft 72', which is rotatably mounted in gear box 73 as shown in FIG. 1, mounts and is driven by the sheave 70'. Bevel gear 74', which is mounted on and driven by shaft 74', engages right-angle drives bevel gear 76 in a 2:1 step-down speed ratio, as shown in FIG. 8. The upper extension of vertical shaft 78', which is rotatably mounted in gear box 73 and which has an axis which intersects shaft 72' at right angles, mounts and is driven by a bevel gear 76. A bevel driven gear 74 engages and is right-angle driven by bevel gear 76 in a 1:2 step-up speed ratio. Horizontal shaft 72, which is rotatably mounted in gear box 73 and has an axis which is an extension of the shaft 72' axis, mounts and is driven by bevel gear 74. Sheave 70 is mounted on and driven by shaft 72. Belt 68 engages and is driven by sheave 70 and drives sheave 54 in a 5:2 step-up speed ratio.

A hollow spindle 76 is fixedly mounted to and extends downward from the plate 26 in concentric relation with the extended axis of vertical drive shaft 78, as shown in FIG. 2. Axially spaced top and bottom journals 84 and 86 are mounted within flanged adapters 84' and 86' which are concentrically mounted and axially fixed within the spindle 76.

A separator element 75 has a rotary mode of motion imparted thereto by a screen drive shaft 82 having an upper end 81 extending above the top journal 84 and a lower end 83 extending below the bottom journal 86. Shaft 82 is rotatably mounted in the journals 84 and 86. A modified Oldham coupling 80 mounts to the drive shaft 78 extending downwardly from the rotary drive 73 and having a driving flanged hub 79 attached thereto. The hub 79 is firmly keyed to the shaft 78. A driven flanged hub 85 on the coupling 80 mounts to the upper end 81 of the shaft 82 and is firmly keyed thereto. Across the faces of flanged hubs 79 and 85 deep grooves 79' and 85', respectively, pass through the center lines in each. Between the faces of the flanges is interposed a thick intermediate disk 87 which has a wide tongue 87' on each side thereof running diametrically across its face. The tongues 87' only partially engage with the grooves 79' and 85' within the faces of the flanged hubs 79 and 85, respectively. The tongues 87' in the intermediate disk 87 are placed at right angles to each other so that rotary motion can be transmitted from shaft 78 to shaft 82 and to separator element 75 at a uniform rate although the axes of the two shafts are not in alignment and shaft 82 reciprocates endwise with respect to shaft 78.

A compression spring capsule 99 which is concentrically supported between adapters 84' and 86' on spindle 76 comprises a collar 88 having a top side 89 and a bottom side 87 which is integrally mounted to shaft 82, as shown in FIG. 2. Anti-friction thrust bearings 90 and 92 are concentrically mounted on shaft 82 in contact with the bottom and top sides 87 and 89, respectively, of collar 88. Bottom and top inner adapter rings 94 and 96 contact opposed bottom and top races of the bearings 90 and 92 in concentric relation with the shaft 82. Opposed compression coiled springs 98 and 100 contact the bottom and top inner adapter rings 94 and 96 in concentric relation with shaft 82. Bottom and top outer adapter rings 102 and 104 contact opposed bottom and top of the compression coiled springs 98 and 100 in concentric relation with shaft 82 and in contact with the flanged adapters 84' and 86', respectively, affixed within hollow spindle 76. The shaft 82 with collar 88 is free to move between the adapters 84' and 86' in the journals 84 and 86 in a vertical mode of motion resiliently constrained therein to return to a neutral position by the opposed urging of compression springs 98 and 100 acting on the thrust bearings 90 and 92. Lubricant is fed up a passage 99 in the center of shaft 82 leading to feed holes 101 supplying the journals 84 and 86 with lubrication for the easy sliding and rotating of the shaft 82 therein.

The separator element 75 has a vertical vibratory mode of motion imparted thereto from the inner frame 34 in response to the vertical excitation of shaking drive 47 which is transmitted thereto through the compression spring capsule 99, as shown in FIG. 2. A separator support 107 on the lower end 83 of screen drive shaft 82 imparts to the shaft 82 the same vertical vibratory mode of motion. The separator support 107 comprises a sleeve element 105 which is pinned to the lower end 83 of the shaft 82. A base end 103 of a basket tube 106 is adaptively mounted on the sleeve 105 in concentric relation with the spindle 76 so that as the shaft 82 rotates and vibrates in a vertical mode of motion within the spindle 76, the basket tube 106 rotates and vibrates in sympathy on the outside of the spindle 76. A cap 108 which is cylindrically fitted to the lower end 83 of the shaft 82 and flange mounted to the base 103 of basket tube 106 adds additional support to the tube 106. The upper end 81 of shaft 82 and flanged hub 85 of the Oldham coupling 80 thus have this same vertical vibratory mode of motion so that the coupling 80 must absorb by endwise sliding the difference in vibratory motion of the driver hub 79 relative to the driven hub 85. The grooves 79' and 85' in the faces of flanged hubs 79 and 85 have a depth sufficient to absorb this endwise differential motion by sliding engagement on the wide tongues 87' on the thick intermediate disk 87.

In feeding of aggregate particulate containing foreign matter to an inlet port 116 at the top of the separator, an annular distributor duct 118 is in flow communication with the inlet port 116 below for distributing the aggregate to a spin chamber 109. The purpose of the spin chamber 109 is to centrifugally distribute the dry aggregate in a thin even layer around an inner surface 124 of the rotating screen 112 and prevent a dropping through the center 122 without contacting the inner surface 124 thereof. The spin chamber 109 comprises a plurality of spin plates 110 which are structurally mounted to and radially disposed along an upper end 107 of the basket tube 106, as shown in FIG. 1. A separation chamber 120 which is below the spin chamber 109 and in flow communication with said spin chamber 109 comprises a vertical rotating cylindrical screen 112 having center 122.

A stationary collecting shell 114 surrounds the cylindrical rotating screen 112 for the collection of the small foreign matter which is discharged therethrough at high radial "G" centrifugal field. An annular collecting funnel 128 is in flow communication with the collecting shell 114 and comprises a stationary inner wall 129 which overlaps and forms a running seal 130 with the lower end of rotating cylindrical screen 112. This effectively seals the collecting shell 114 from the moving separation chamber 120. An extended stationary outer wall 131 forms a suitable bolted flange attachment 132 for the piping away of the discharge of collected foreign matter which has been separated from the aggregate fed to the machine.

A collecting funnel 126 which is comprised in part of the stationary inner wall 129 for the collection of the large particulate matter is in flow communication with the lower end of the rotating screen 112 and forms a suitable bolted flange attachment 133 for the piping away of the aggregate which has been cleaned of the small particulate foreign matter and discharged from the machine.

A separating machine under dynamic drive input with a steady alternating force of constant frequency applied in a vertical direction thereto transmits obnoxious shaking forces to the floor or other supporting structure, especially when it is close to resonance. In order to isolate or reduce this transmitted force to a small value with the separator machine of this invention consider the schematic representation of the vertical mode of motion of the machine with the vertical shaking force $P_o \sin wt$ generated by the contra-rotating eccentric weights 48 acting on and vertically shaking the separator element 75, as shown in FIG. 7. The equations of motion of this system, as simplified without damping, are $$M\ddot{x}_1 + (K + k)x_1 - kx_2 = P_o \sin wt$$
$$m\ddot{x}_2 + k(x_2 - x_1) = 0$$

(1a,b)

where the parametric quantities are as follows:
$Mg$ = weight of inner frame assembly, lb.
$mg$ = weight of cylindrical separator screen assembly, lb.
$K$ = inner frame suspension spring rate, lb./in.
$k$ = cylindrical screen suspension spring rate, lb./in.

$x_1$ = vertical amplitude of inner frame, in.
$x_2$ = vertical amplitude of screen, in.
$P_o$ = centrifugal force of the eccentric weights, lb.
$w$ = angular frequency of eccentric weights, rad./sec.

$t$ = time, sec.
$g$ = acceleration of gravity, in./sec.$^2$
for which the solution by standard means gives the following:

$$\frac{x_1}{x_{3r}} = \frac{1-\left(\frac{\omega}{\omega_n}\right)^2}{\left[1-\left(\frac{\omega}{\omega_n}\right)^2\right]\left[1+\frac{k}{k}-\left(\frac{\omega}{\Omega_n}\right)^2\right]-\frac{k}{k}}$$

$$\frac{x_2}{x_{3r}} = \frac{1}{\left[1-\left(\frac{\omega}{\omega_n}\right)^2\right]\left[1+\frac{k}{k}-\left(\frac{\omega}{\Omega_2}\right)^2\right]-\frac{k}{k}}$$

(2a, b)

where the parametric quantities are as follows:
$x_{st} = P_o/K$, static deflection of inner frame, in.
$\omega_n = \sqrt{k/m}$, natural angular frequency of separator screen and spring system, rad./sec.
$\Omega_n = \sqrt{K/M}$, natural angular frequency of the inner frame and spring system, rad./sec.

Using typical parametric values in which $\Omega_n$ is usually assumed equal to $\omega_n$, the amplitudes of the inner frame assembly and of the cylindrical separator screen assembly for various angular frequencies of given eccentric weights are shown graphically in FIGS. 6 and 7. Follow the inner frame response diagram FIG. 6 for an increasing frequency ratio $\omega/\Omega_n$ and it is seen that $x_1/x_{st} = 1$ for $\omega = 0$ while for values somewhat larger than zero, $x_1$ is positive, since both the numerator and the denominator of Equation 2a are positive. At the first resonance, the denominator passes through zero from positive to negative; hence $x_1/x_2$ becomes negative. Still later, at $\omega=\omega$ operation, the operating angular frequency of the eccentric weights where the inner frame response $x_1/x_2$ equals zero optimizing the vertical movement of the separator screen while maintaining a minimum vertical shaking force transmitted to the floor or supporting structure, the numerator becomes negative and $x_1/x_2$ becomes positive again, since both numerator and denominator are negative. At the second resonance, the denominator changes sign once more with a negative $x_1$ as a result.

The separator screen response $x_2/x_{st}$ diagram FIG. 7 passes through similar changes, only here the numerator remains positive throughout so that changes in sign occur only at the resonance points. At $\omega = \omega$ operation, where the inner frame response equals zero $$x_2/x_{st} = K/k$$

(3)

giving a vertical vibratory mode of motion of the cylindrical screen 112 equal to about three-fourths inch double amplitude for the typical parametric values which results in zero vertical shaking force transmitted to the floor or supporting structure.

A separating machine rotating with a weight imbalance transmits obnoxious shaking forces to the floor or other supporting structure. In order to isolate or reduce this transmitted force, consider the schematic representation of the gyratory mode of motion of the machine, as shown in FIG. 5, with lower stabilizing links 42' removed, as shown in FIG. 3, under a force imbalance generated from an uneven distribution of the flow of aggregate along and through the inner surface 124 of the cylindrical screen 112 which is rotating at a constant speed $N$ on shaft 78 in journals 84 and 86. Let the center of gravity of the screen 112 and contained aggregate be at a radial distance $e$ from the center 122 of the shaft 78. As the screen 112 gyrates about the shaft center 122, there is a rotating centrifugal force $m(N/2\pi)^2e$ which is resolvable into mutually orthogonal components of the same amplitude $m(N/2\pi)^2e$. The screen 112 thus executes simultaneous vibrations in mutually orthogonal planes, and in particular, the speed of the screen 112 will be critical when these component forces are in resonance with the natural frequency of the screen 112 and contained aggregate about the center of elastic support 138. The center of elastic support 138 is defined by the geometrical arrangement of the four corner springs 22 on the outer frame 10.

In a gyrating unbalanced screen 112 and contained aggregate there are two forces acting on the screen 112: First, the elastic restoring spring forces of springs 22, and second, the centrifugal force on the center of gravity which is gyrating in a circle of radius $(\Gamma + e)$. For a steady gyrating motion, these two forces must be in equilibrium. Equating torques this gives:

$$k_\theta \cdot \Gamma/L = m(N/2\pi)^2\Gamma L + m(N/2\pi)^2 eL$$

(4)

where:
$\Gamma$ = deflection of screen center line 122' at $L$ in.
$e$ = distance between CG and center line of shaft 122, in.
$L$ = distance between screen 112 CG and elastic center of springs 22, in.
$k_\theta$ = torsional stiffness about elastic center, in.-lb./rad.

Referring to the drawings, as shown in the left hand side of composite FIG. 3, a vertical rotating screen separator, which isolates both vertical shaking forces and gyrating forces introduced into the rotating cylindrical screen 112 from any rotating unbalance of grain distribution in the screen 112, comprises four parallel-bar, stabilizing single-bar linkages 35' pivotally connecting the four sides 33 of the inner frame 34 to the four sides 13 of the outer frame 10. Four ears 36 are mounted on the four leg members 12 adjacent to th four pads 20 to form the basis of this pivotal connection. One such single-bar comprises pivot pins 38 which are horizontally mounted to the ears 36 having axes in mutually orthogonal vertical planes in the plane of the elastic center of the four springs 22 on the frame 10. Bored bosses 40 swively mount on the axes of pins 38. Links 42 connect at one end to the bosses 40. Bored bosses 44 mount to the other ends of links 42 having axes parallel to the axes of bosses 40. Pivot pins 46 engage bosses 44 at the other ends and fixedly mount midway on the top cross-member 31 of the inner frame 34 assuring and stabilizing a rectilinear vertical vibratory mode of motion of the inner frame 34 only in a plane containing the elastic center 138 of the four springs 22, and allowing the rotating cylindrical screen 112 and the lower end of inner frame 34 to gyrate about its own CG in the isolation of all horizontal shaking forces arising from any aggregate imbalance in the rotating screen 112.

Solving equation 4 for the screen deflection $$\theta = e/L \, ^x \, [(N/2\pi\Omega_n)^2/1 - (N/2\pi\Omega_n)^2]$$

(5)

where:

$\theta = \Gamma/L$, angle of gyration, rad.

$\Omega_n = \sqrt{k_\theta \, g/I_\theta}$ , natural angular frequency, rad./sec.

$I_\theta$ = moment of inertia of inner frame 34 and screen 112 about elastic center of springs 22, lb.-in.$^2$ Interpretation of equation 5 shows that for very slow rotational speeds ($N \approx 0$), the angle $\theta$ of gyration is practically zero; at the critical speed ($N = 2\pi\Omega_n$), $\theta$ becomes infinite, while for very large speeds, the screen 112 with contained aggregate rotates about the CG which remains at rest on the center line 122 resulting in zero horizontal shaking force transmitted to the floor or supporting structure.

It is understood that spring means 140, as shown in the right hand side of composite FIG. 3, comprising a pair of brackets 142 mounted to the legs 12 of outer frame 10, a leaf spring 144 mounted at both ends to the brackets 142 and having pad 146 which is centrally mounted thereto to cross member 31 of inner frame 34 without coil springs 22, can serve equally well as the primary spring suspension means for the inner frame 34 in the outer frame 10 as does the stabilizing linkages 35.

Although several specific embodiments of this invention have been herein shown and described, it will be understood that the details of construction shown may be altered or omitted without departing from the spirit of the invention as defined by the appended claims.

We claim:

1. A vertically resonant two-degree-of-freedom shaking drive for improved vibratory conveying of material in the vertical direction through a centrifugal separator having a low vibratory force transmissibility to a supporting structure in the vertical and the horizontal directions comprising:

a. a primary spring system mounted on the structure having compliance along a line of action extending in the vertical direction and along lines of action extending in all horizontal directions extending therefrom, b. a primary mass having a set of principal axes with the first principal axis extending in the vertical direction and the two other principal axes extending laterally therefrom, said first principal axis coincident with said vertical direction when the vertical shaking force is inoperative, said primary mass suspended from the primary spring system and having a natural vibratory mode of motion along said vertical direction at the natural frequency of said natural mode, and vibratory modes of motion extending along lines of action in each of all horizontal directions therefrom, each mode having a frequency equal to the speed of the centrifugal separator and less than the natural frequencies corresponding to natural vibratory modes of motion thereof, c. a forcing function applied to the primary mass along a line of action extending in the direction of the first principal axis thereof and having an exciting frequency greater than the natural frequency of the primary mass and spring system by an amount which minimizes vibration in a mode of motion extending along said line of action, d. a secondary spring system supported from said primary mass having compliance along a line of action extending in the direction of the first principal axis thereof, and e. a secondary mass including the centrifugal separator and a driving means therefor mounted thereon having a second principal axis coincident with and extending in the direction of the first principal axis, said secondary mass suspended from the secondary spring system and having a natural vibratory mode of motion relative to that of the primary mass along said first and second principal axes at a natural frequency for said natural mode wherein said natural frequency is substantially in resonance with the exciting frequency of the forcing function as applied to the primary mass.

2. A vertical resonant two-degree-of-freedom shaking drive for a centrifugal separator as set forth in claim 1 wherein the primary spring system comprises a plurality of laterally constrained spring elements symmetrically mounted about and equi-distant from the first principal axis and mounted in a given lateral plane above the center of graviJy of the combined primary and second masses and having compliance along a line of action extending in the direction of the first principal axis.

3. A vertical resonant two-degree-of-freedom shaking drive for a centrifugal separator as set forth in claim 2 wherein the plurality of laterally constrained spring elements comprise leaf springs each having centers fixedly mounted to the primary mass and ends symmetrically and slidably bearing on a horizontal projection of the supporting structure.

4. A vertical resonant two-degree-of-freedom shaking drive for a centrifugal separator as set forth in claim 2 wherein the plurality of laterally constrained spring elements comprise coil compression springs of equal stiffness contained in diametrally close-fitting cylindrical cups each spring and cup bearing on the primary mass and the supporting structure.

5. A vertical resonant two-degree-of-freedom shaking drive for a centrifugal separator as set forth in claim 2 wherein the exciting frequency is substantially equal to 3.0 times the natural frequency of the primary mass and spring system vibrating in a mode of motion having a line of action extending along said first principal axis.

6. A vertical resonant two-degree-of-freedom shaking drive for a centrifugal separator as set forth in claim 1 wherein the primary mass comprises an inner frame assembly limited by a plurality of straight-line mechanism elements to a vibratory mode of action across the given lateral plane having a line of action extending in the direction of the first principal axis.

7. A vertical resonant two-degree-of-freedom shaking drive for a centrifugal separator as set forth in claim 6 wherein the plurality of straight-line mechanism elements comprise horizontal, equal-length, single-bar links pivotally mounted at one end to the primary mass and at the other end to the supporting structure and symmetrically disposed in the given lateral plane about and equi-distant from the first principal axis.

8. A vertical resonant two-degree-of freedom shaking drive for a centrifugal separator as set forth in claim 1 wherein the forcing function includes equal contra-rotating masses of like eccentricity driven in the same phase relationship relative to each other by a prime mover at equal but opposite rotational speeds and journaled on said primary mass for rotation in planes parallel to and symmetrically disposed relative to the first principal axis thereon.

9. A vertical resonant two-degree-of-freedom shaking drive for a centrifugal separator as set forth in claim 8 wherein the prime mover comprises an electric motor having a mitre gear box for separately driving the contra-rotating eccentric masses and the rotating cylindrical screen.

10. A vertical resonant two-degree-of-freedom shaking drive for a centrifugal separator as set forth in claim 1 wherein the secondary spring system comprises equal compression coil springs coaxially mounted in opposed relation to each other along the direction of the first principal axis one bearing from above on the top of and the other bearing from below on the bottom of the secondary mass and the two exerting compressive force between structural elements of the primary mass, and journal and thrust bearing means allowing rotation of the secondary mass relative to the primary mass while permitting the relative vibratory motion and the exertion of secondary spring compressive force therebetween.

11. A vertical resonant two-degree-of-freedom shaking drive for a centrifugal separator as set forth in claim 10 wherein the centrifugal separator includes an open-ended cylindrical screen having its cylindrical axis journaled on the secondary mass along an axis coincident with the second principal axis for rotation thereabout.

12. A vertical resonant two-degree-of-freedom shaking drive for a centrifugal separator as set forth in claim 1 wherein the primary mass comprises an inner frame assembly limited by a plurality of straight line mechanism elements to a vibratory mode of motion having a line of action extending in the direction of the vertical.

13. In a screen separator for separating small from large dry particulates including a vertical rotating hollow cylindrical screen having an outlet and an inlet with a distributor means at said inlet for keeping the particulates from dropping through the screen center without contacting the screen inner surface, a collecting shell surrounding said vertical screen for collecting the small particulates centrifugally thrown out from the screen, a collecting funnel and spout in flow communication with the lower end of the shell for carrying away the small particulates, and a collector funnel and spout in flow communication with the outlet of said screen for carrying away the large particulates, the combination with said vertical rotating screen separator of:
 a. an outer frame mounted to the floor,
 b. an outer spring suspension means mounted on said outer frame having compliance limited to the direction of the vertical,
 c. an inner frame suspended from the outer spring suspension means and limited to vertical movement relative to the outer frame,
 d. a pair of contra-rotating eccentric weights mounted to said inner frame and having a vertical alternating resultant force output directed along the said vertical direction and operationally applied to the inner frame,
 e. an inner spring suspension means supported from said inner frame having compliance only along said vertical direction,
 f. a rotating cylindrical screen having its axis on the vertical journaled about said axis on the inner frame and suspended from said inner spring suspension means for rotation in and vertical slidable movement relative to the inner frame, and
 g. an electric motor mounted on the inner frame having a drive means including an output shaft having an Oldham-type coupling means mounted thereon for driving said rotary screen and allowing simultaneous relative movement in the vertical direction thereof.

14. In a separator as set forth in claim 13 wherein said outer spring suspension means comprises:
 a. a coil spring means having compliance in the vertical direction, and
 b. a plurality of linkage means in mutually orthogonal vertical planes pivotally connecting said inner and outer frames for limiting the relative motion of the inner frame therebetween to the direction of the vertical.

15. In a separator as set forth in claim 14 wherein said coil spring means comprises a plurality of equally-spaced coil springs set in a plurality of horizontal planes equidistant from the axis of the vertical cylindrical screen and mounted on the inner frame and said linkage means comprises two equal-length parallel-bar links.

16. In a separator as set forth in claim 14 wherein said coil spring means comprises a plurality of equally-spaced coil springs set in a horizontal plane equidistant from the axis of the vertical cylindrical screen and mounted on the inner frame above said vertical rotating screen and said linkage means comprises a plurality of equal-length parallel and co-planar single-bar links in mutually orthogonal vertical planes pivotally connecting said inner and outer frames.

17. In a separator as set forth in claim 13 wherein said outer spring suspension means comprises a leaf spring means having compliance in the vertical direction.

18. In a separator as set forth in claim 17 wherein said leaf spring means comprises a plurality of equally spaced leaf springs set in a plurality of horizontal planes equidistant from the axis of the vertical cylindrical screen and mounted on the inner frame.

19. In a separator as set forth in claim 17 wherein said leaf spring means comprises a plurality of equally-spaced leaf springs set in a horizontal plane equidistant from the axis of the vertical cylindrical screen and mounted on the inner frame.

20. In a separator as set forth in claim 13 wherein said inner spring suspension means comprises:
 a. a hollow spindle having a top and a bottom adapter axially spaced therein and mounted within and depending from the inner frame in a central vertical relation thereto,
 b. spaced journals mounted in the top and bottom adapters within the hollow spindle,
 c. a screen drive shaft having a top and bottom ends and rotatably and slidably mounted in said spaced journals and having an integral collar mounted thereto between said spaced journals, said collar having a top side and a bottom side, said top end connected to the Oldham-type coupling means,
 d. anti-friction thrust bearings mounted on said drive shaft contacting the top side of the collar and the bottom side thereof,
 e. springs concentrically mounted on said shaft, one in compression between the top thrust bearing on the drive shaft and the top adapter in the hollow spindle and the other in compression between the bottom thrust bearing on the drive shaft and the bottom adapter in the hollow spindle, and f. an adapter mounted to and depending from the bottom end of the screen drive shaft suspending said cylindrical screen therefrom.

21. A vertical resonant two-degree-of-freedom shaking drive for improved vibratory conveying of material in the vertical direction through a centrifugal separator having a low vibratory force transmissibility to a supporting structure in the vertical direction comprising:

a. a primary spring system mounted on the structure having compliance along a line of action extending in the vertical direction, b. a primary mass having a set of principal axes with the first principal axis extending in the vertical direction, said primary mass suspended from the primary spring system and having a natural vibratory mode of motion along said vertical direction at the natural frequency of said natural mode, c. a forcing function applied to the primary mass along a line of action extending in the direction of the vertical and having an exciting frequency greater than the natural frequency of the primary mass and spring system by an amount which minimizes vibration in a mode of motion extending along said line of action, d. a secondary spring system supported from said primary mass having compliance along a line of action extending in the direction of the vertical, and e. a secondary mass including the centrifugal separator and a driving means therefor mounted thereon having a second principal axis coincident with and extending in the direction of the first principal axis, said secondary mass suspended from the secondary spring system and having a natural vibratory mode of motion relative to that of the primary mass along said first and second principal axes at a natural frequency for said natural mode wherein said natural frequency is substantially in resonance with the exciting frequency of the forcing function as applied to the primary mass.

22. A vertical resonant two-degree-of-freedom shaking drive for a centrifugal separator as set forth in claim 21 wherein the primary mass comprises an inner frame assembly limited by a plurality of straight-line mechanism elements to a vibratory mode of motion having a line of action extending in the direction of the vertical.

23. A vertical resonant two-degree-of-freedom shaking drive for a centrifugal separator as set forth in claim 22 wherein the plurality of straight-line mechanism elements comprise horizontal, equal-length, parallel-bar, four-bar linkages pivotally mounted at one end to the primary mass and at the other end to the supporting structure, and symmetrically disposed about and equidistant from the vertical axis.

24. A vertical resonant two-degree-of-freedom shaking drive for a centrifugal separator as set forth in claim 21 wherein the exciting frequency is substantially equal to 3.0 times the natural frequency of the primary mass and spring system vibrating in a mode of motion having a line of action extending in the direction of the vertical.

* * * * *